(12) United States Patent
Van Blokland

(10) Patent No.: US 12,035,722 B2
(45) Date of Patent: Jul. 16, 2024

(54) DEVICE, DOUGH LINE AND METHOD FOR ROLLING DOUGH

(71) Applicant: Radie B.V., BC Culemborg (NL)

(72) Inventor: Johannes Josephus Antonius Van Blokland, BG Laren (NL)

(73) Assignee: Radie B.V., Culemborg (NL)

( * ) Notice: Subject to any disclaimer, the term of this patent is extended or adjusted under 35 U.S.C. 154(b) by 22 days.

(21) Appl. No.: 16/246,969

(22) Filed: Jan. 14, 2019

(65) Prior Publication Data
US 2019/0223452 A1  Jul. 25, 2019

(30) Foreign Application Priority Data
Jan. 25, 2018 (EP) .................................. 18153519

(51) Int. Cl.
| | |
|---|---|
| *A21C 3/02* | (2006.01) |
| *A21C 11/16* | (2006.01) |
| *A21C 14/00* | (2006.01) |
| *B29C 43/24* | (2006.01) |
| *B29C 43/48* | (2006.01) |

(Continued)

(52) U.S. Cl.
CPC ............ *A21C 3/024* (2013.01); *A21C 11/163* (2013.01); *A21C 14/00* (2013.01); *B29C 43/245* (2013.01); *B29C 43/48* (2013.01); *A21C 9/08* (2013.01); *B25J 9/00* (2013.01); *B29C 2043/486* (2013.01)

(58) Field of Classification Search
CPC ......... A21C 3/024; A21C 3/025; A21C 3/027; A21C 3/02; B29C 2043/486
See application file for complete search history.

(56) References Cited

U.S. PATENT DOCUMENTS

| | | | |
|---|---|---|---|
| 2,170,424 A | 8/1939 | Parsons | |
| 2,289,388 A * | 7/1942 | Stiles | .................. A21C 3/02 |
| | | | 425/335 |

(Continued)

FOREIGN PATENT DOCUMENTS

| | | | |
|---|---|---|---|
| CN | 107912481 | * | 4/2018 |
| DE | 196 05 238 A1 | | 7/1997 |

(Continued)

OTHER PUBLICATIONS

WO2015169503 translation (Year: 2015).*

(Continued)

*Primary Examiner* — S. Behrooz Ghorishi
*Assistant Examiner* — Alexander A Wang
(74) *Attorney, Agent, or Firm* — Welsh IP LAW LLC

(57) ABSTRACT

The present invention relates to a dough processing device, for use on a dough line, comprising dough processing means, such as a flour dispenser, a roller, a cutter, a folding shoe, for processing the dough on a conveyor; arranged in a frame, arranged for being placed as a bridge over a dough conveyor and thereto having supports at opposite ends; provided with fastening means, for fastening the supports on either side to a dough conveyor housing; wherein at least one support is provided with transport means, for transporting the dough processing device directly over a conveyor while supporting the dough processing device on said conveyor. The invention further relates to a dough processing line comprising such a dough processing device.

16 Claims, 3 Drawing Sheets

(51) Int. Cl.
    *A21C 9/08* (2006.01)
    *B25J 9/00* (2006.01)

(56) References Cited

U.S. PATENT DOCUMENTS

| | | | | |
|---|---|---|---|---|
| 2,735,379 | A * | 2/1956 | Stiles | A21C 3/024 425/102 |
| 3,753,638 | A * | 8/1973 | Simpson | A21C 3/025 425/374 |
| 4,880,375 | A * | 11/1989 | Hayashi | A21C 3/027 425/335 |
| 5,246,363 | A * | 9/1993 | Morikawa | A21C 3/024 425/DIG. 53 |
| 5,686,129 | A * | 11/1997 | Zaltron | A21C 3/02 426/502 |
| 5,783,222 | A | 7/1998 | Voyatzakis et al. | |
| 2003/0185927 | A1 * | 10/2003 | Morikawa | A21C 3/025 425/363 |
| 2006/0034988 | A1 | 2/2006 | Bresnahan et al. | |

FOREIGN PATENT DOCUMENTS

| | | |
|---|---|---|
| DE | 202 12 725 U1 | 11/2002 |
| FR | 1 115 850 A | 4/1956 |
| WO | WO2015169503 | * 11/2015 |

OTHER PUBLICATIONS

CN 107912481 machine translation (Year: 2018).*
Extended European Search Report for European Patent Application No. 18153519.6 with a mailing date of Jun. 29, 2018.

* cited by examiner

DEVICE, DOUGH LINE AND METHOD FOR ROLLING DOUGH

TECHNICAL FIELD

The present invention relates to a device, dough line and a method for rolling dough. In particular the invention relates to rolling dough wherein the dough roller is moved perpendicular to a direction of conveyance of the dough, also referred to as cross rolling, wherein the dough is a dough sheet in a so called sheeting-type dough line.

BACKGROUND

In dough sheeting lines, a continuous sheet of dough is produced, and conveyed along multiple dough processing devices. When making the sheet, various rolling operations are performed, until a sheet with a desired thickness and width is obtained.

Subsequent processing steps may be cutting pieces to form individual dough products. Commonly, these pieces should have equal sizes and weights, which sets requirements to the homogeneity of the thickness and density of the dough sheet.

During forming of the sheet, several dough rolling steps are taken. After the sheet is formed with a quick reducer, a first step may be cross rolling the dough, followed by one or more reducers, in which a stationary roller rolls the dough in the direction of conveyance. The term stationary roller is used throughout this application to indicate a roller that is at a fixed position. Dough rolled by such roller has the tendency to have an unequal homogeneity in a direction perpendicular to the direction of conveyance, that is: its width direction. This leads to a larger variation in the weight of the separate dough pieces. In order to meet individual product specifications, especially minimum weight requirements, safe margins are used when cutting individual products. This however does not solve the spread in specifications of the individual products and leads to the use of more dough than strictly required.

SUMMARY

It is a goal of the present invention to take away the disadvantages of the prior art or to provide a suitable alternative to the existing devices, dough lines and methods.

The invention thereto proposes a device for rolling dough, comprising a conveyor, in particular an endless conveyor belt, for conveying a dough sheet in a direction of conveyance, a roller, for rolling the dough sheet with at least a directional component perpendicular to the direction of conveyance, wherein the device is configured for varying the distance between the upper surface of the conveyor and the roller during rolling according to any predetermined distance pattern as a function of the position of the dough roller in a direction perpendicular to the direction of conveyance. Herein, the pattern may be different for every stroke and/or in both directions. Additionally, it may be possible to select the distance such that the dough is only touched during part of a stroke, for instance from the middle of the dough piece to an outer edge.

The present invention therewith provides a device that can be used to take away the disadvantages of the prior art, and in particular the undesired effect a reducer induces in the dough. It has appeared that due to the fact that in the state of the art, the dough at the edges of the dough sheet has more space to expand to than the dough in the center of the sheet, a higher density of the dough is obtained in the middle of the dough sheet. The device according to the invention enables to vary the distance between the upper surface of the conveyor and the roller and thereby to vary the density of the rolled dough in the direction perpendicular to the direction of conveyance. With this facility, it is amongst others possible to pre-compensate for the undesired effects of the reducing rollers. This is done by applying a height distribution over the width of the dough sheet that leads to a density that is inversely distributed to a known distribution induced by a reducer. Evidently, by changing the distance between the upper surface of the conveyor and the roller the density of the dough can also be varied in the direction of conveyance, if such would be desired for any purpose.

DETAILED DESCRIPTION

Where "the distance between the upper surface of the conveyor and the roller" is mentioned in this application, the shortest distance between the mantle of the roller and the upper surface is meant, that is, from the lowest point of the roller to the highest point of the conveyor, in other words the distance of the gap that remains for the dough.

In a practical embodiment, the device according to the invention comprises a suspension along which the roller is guided in a direction perpendicular to the direction of conveyance, wherein the suspension is movable in a direction from and toward the conveyor. The roller may for instance be guided along a pair of bars, wherein the pair of bars is suspended such that their height can be varied with respect to the conveyor. One possible embodiment is to suspend the roller on a parallelogram construction, wherein the angles of the legs of the parallelogram are adjustable for moving the suspension from and toward the conveyor. An alternative embodiment comprises an eccentric transmission for moving the suspension from and toward the conveyor. Yet another embodiment comprises a robot arm for moving the roller. Such robot arm may additionally be configured for moving the roller with a directional component in the direction of conveyance of the dough, in order to avoid damage or tear of the dough, or to obtain a certain pattern.

The device may comprise at least one actuator for moving the suspension, which may in particular be a servo motor, and a controller for controlling the at least one actuator. Such controller may be configured for controlling the at least one actuator based on a predetermined setting which may for instance be a function of the position of the roller in a width direction of the dough. Alternatively, the dependency may be on an external signal such as a measurement signal from one or more sensors. Embodiments with multiple actuators are possible too according to the present invention. These actuators may for instance be arranged on either side of the conveyor belt.

In yet another embodiment, the roller is suspended above the surface of the conveyor, wherein at least a part of a support surface over which the conveyor is guided is movable in or from the direction of the roller for varying the distance between the upper surface of the conveyor and the roller during rolling. As a result, also in this embodiment the distance between the upper surface of the conveyor and the roller is varied during rolling. Such surface may be provided with one or more elements that can be elevated from the surface in order to push the conveyor toward the roller. In that case the roller may be moved in a straight line, but the dough is guided over an vaulted surface. A combination of embodiments is also thinkable, wherein both the trajectory the roller follows is not straight, and the conveyor is moving over a vaulted surface.

The invention will now be elucidated into more detail with reference to the following figures. Herein:

Figure 3A:
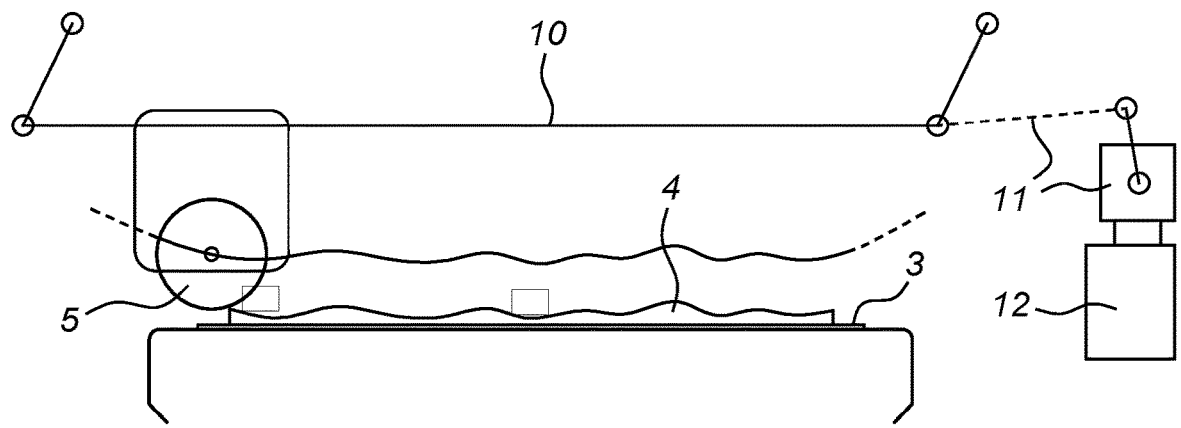
Figure 4A:
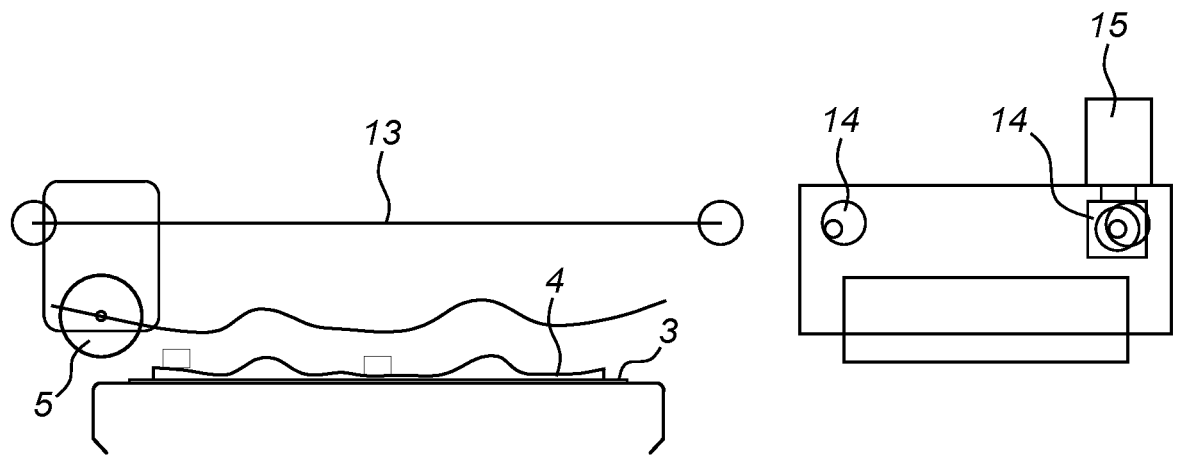

FIGS. 3a, b show a first embodiment the present invention in different positions;

FIGS. 4a, b show a second embodiment the present invention in different positions.

Figure 1:
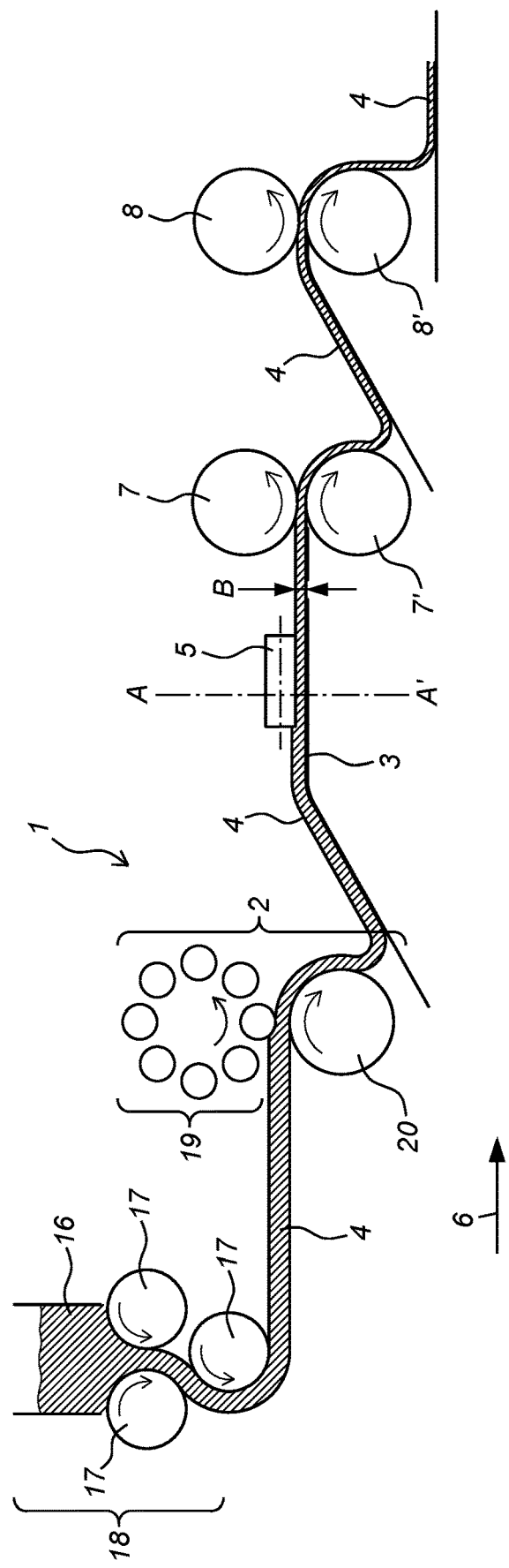
FIG. 1 shows a schematic view of a dough sheeting line.

FIG. 1 shows a schematic view of a dough sheeting line 1 according to the present invention. The dough sheeting line comprises an extruder 18 comprising a funnel 16 followed by a number of rollers 17, for creating a dough sheet 4. The extruder 18 is followed by a quick reducer 2 comprising a dough roller carousel 19 cooperating with a stationary roller 20 for providing a dough sheet 4 on a conveyor 3, which conveys the dough in direction 6. Other configuration for providing a dough sheet are thinkable and may also applied according to the present invention. The sheeting line 1 further comprises a cross roller 5, which reduces the thickness (seen in the direction B) of the dough sheet. The cross roller is followed by a first reducer 7 comprising a stationary roller which rolls the dough in the direction of conveyance and a second reducer 8 comprising the same. The cross roller 5, first reducer 7 and second reducer 8 subsequently further reduce the thickness of the dough sheet.

Figure 2:
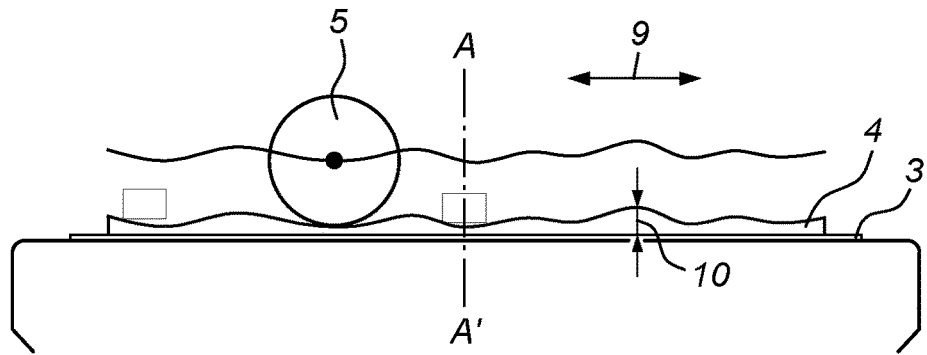
FIG. 2 shows a schematic cross section of the line from FIG. 1.

FIG. 2 shows a schematic cross section of the dough line 1 seen in the direction A-A' in FIG. 1. Visible are the conveyor 3 for conveying a dough sheet 4 in a direction of conveyance (in this figure toward or from the viewer), a roller, formed by cross roller 5, for rolling the dough sheet 4 with at least a directional component 9 perpendicular to the direction of conveyance 6. The device 1 is configured for varying the distance 10 between the upper surface of the conveyor 3 and the roller 5 during rolling. Such distribution of the thickness in the width direction of the dough 4 may be chosen in order to compensate for the effects the reducers 2, 7, 8 are known to have.

Figure 3B:
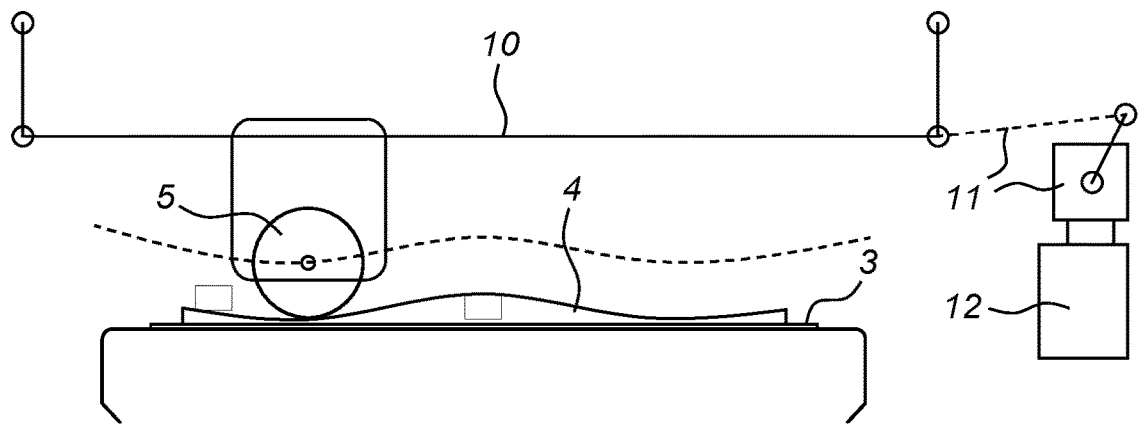

FIG. 3a shows a schematic representation of a first embodiment of the present invention. In the embodiment, a suspension 10 is present along which the roller is guided in a direction perpendicular to the direction of conveyance 6. The suspension 10 is movable in a direction from and toward the conveyor 3. This movement is enabled by a parallelogram construction of the suspension 10, wherein the angles of the legs of the parallelogram are adjustable for moving the suspension from and toward the conveyor. An actuator 11 such as a servo motor is provided for moving the suspension, and a controller 12 for controlling the actuator. FIG. 3b shows the embodiment of FIG. 3a in a different position, wherein the actuator is used to move the legs of the parallelogram. In the position depicted in FIG. 3b, the distance between the upper surface of the conveyor and the roller is smaller than in FIG. 3a. By moving the legs during the rolling, any thickness distribution of the dough sheet in its width direction can be obtained.

FIG. 4a shows a second embodiment of the device according to the invention, comprising an eccentric transmission 14 for moving the suspension 13 from and toward the conveyor 3. Here also, an actuator 15 such as a servo motor may be present to control the actuator 15 for moving the transmission and therewith the suspension 13.

Figure 4B:
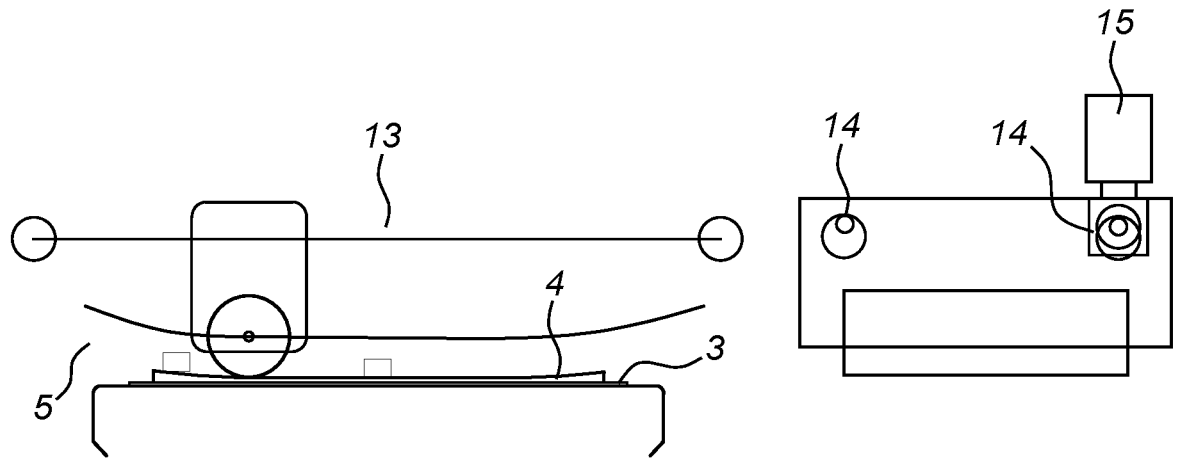

In the position depicted in FIG. 4b, the distance between the upper surface of the conveyor and the roller is smaller than in FIG. 4a. By moving the legs during the rolling, any thickness distribution of the dough sheet in its width direction can be obtained. As visible in the example in FIG. 4b, a curve or path is chosen, wherein the thickness of the dough sheet is higher at its sides than in the middle.

In all embodiments, the controller may be configured for controlling the actuator based on a predetermined setting or dependency. Such setting may be a function of the position of the roller in a width direction of the dough or a predetermined function of for example an external signal, such as a measurement signal, which may be a feedback signal.

This measurement signal can for instance be a signal from a surface measurement, or a measurement on the dimensional stability of dough products cut out of the sheet in a later processing step. An example thereof may be a dough part for forming a croissant, of which the triangular shape is measured after a certain amount of time, or a dough piece for a bottom of a pizza of which an (undesired) ovality is determined.

Yet another possibility is a weight measurement, which may be derived from a line scanner or from one or more weighing sections for parallel dough lanes on a conveyor. For certain purposes, multiple parallel lanes of dough products are derived from one dough sheet. Herein, it is usually desired that all lanes have the same weight or weight distribution. When measurements point out that the dough in the various lanes has an unequal weight, according to the art, it is common to apply a correction by changing the track width. The present invention allows to adapt the dough thickness distribution of the dough sheet before it is cut, in order to arrive at lanes with equal weights. In such configuration, the cross roller may be arranged right before the last reducer.

The above examples are in no way limiting the scope of protection of the present invention, as defined by the following claims.

The invention claimed is:

1. A device for rolling dough, comprising:
a conveyor, wherein the conveyor comprises an endless conveyor belt, for conveying a dough sheet in a direction of conveyance;
a moveable roller configured to roll the dough sheet back and forth in a rolling direction between a first edge and a second edge, the rolling direction having at least a directional component that is perpendicular and transverse to the direction of conveyance, wherein the axis of rotation of the moveable roller is configured to move back and forth in the rolling direction relative to the dough sheet;
a suspension configured to guide the roller back and forth in the rolling direction,
wherein the suspension and the conveyor are configured to selectively vary a height of the roller above an upper surface of the conveyor at each of a position of the moveable roller between the first edge and the second edge while the moveable roller is rolling the dough sheet, wherein a range of available variation of the height of the roller at each position is independent of the position of the moveable roller in the rolling direction.

2. The device according to claim 1, further comprising a parallelogram linkage, wherein the angles of the legs of the parallelogram linkage are adjustable for moving the suspension from and toward the conveyor.

3. The device according to claim 1, further comprising an eccentric transmission for moving the suspension from and toward the conveyor.

4. The device according to claim 1, further comprising:
an actuator configured to selectively vary the height of the roller above the upper surface of the conveyor;
a controller for controlling the actuator.

5. The device according to claim 4, wherein the controller is configured for controlling the actuator based on a predetermined setting or dependency.

6. The device according to claim 5, wherein the setting is a function of the position of the roller in a width direction of the dough.

7. The device according to claim 5, wherein the dependency is based on an external signal.

8. The device of claim 7 wherein the external signal is a measurement signal indicative of an unequal homogeneity in the dough induced by a first roller;
wherein the height of the roller above the upper surface of the conveyor at each of the positions of the moveable roller between the first edge and the second edge is variable adjusted based on the signal.

9. The device of claim 4 wherein the actuator comprises a servo motor for moving the suspension.

10. The device according to claim 1, wherein at least part of the upper surface of the conveyor movable in or from the rolling direction of the roller for varying the distance between the upper surface of the conveyor and the roller during rolling.

11. A dough line comprising a device according to claim 1.

12. A dough line according to claim 11, wherein the roller is followed by at least one stationary roller for rolling the dough in the direction of conveyance.

13. The device of claim 1, further comprising a first roller configured to roll the dough sheet in the direction of conveyance of the dough sheet, wherein the first roller is positioned before the moveable roller along the endless conveyor belt so that a portion of dough passing along the belt is first acted upon by the first roller and then acted on by the moveable roller such that the moveable roller can affect an unequal homogeneity in the dough induced by the first roller.

14. The device according to claim 1, further comprising:
an actuator configured to selectively vary the height of the roller;
a controller for controlling the actuator;
wherein the controller is configured for controlling the actuator to selectively vary the height of the roller based on a signal indicative of an unequal homogeneity in the dough;
wherein the height of the roller above the upper surface of the conveyor at each of the positions of the moveable roller between the first edge and the second edge is variably adjusted based on the signal.

15. A system for rolling dough, comprising:
a conveyor for conveying a dough sheet in a direction of conveyance, the conveyor defining a width between a first side and a second side, the width being perpendicular to the direction of conveyance in a plane of the dough sheet;
a first roller configured to roll the dough sheet in the direction of conveyance of the dough sheet;
a second roller configured to roll the dough sheet in a rolling direction that is perpendicular to the direction of conveyance in the plane of the dough sheet, the second roller positioned after the first roller along the conveyor so that the second roller can affect an unequal homogeneity in the dough induced by the first roller, the second roller being moveable in a first direction that is perpendicular to the direction of conveyance in the plane of the dough sheet so that the position of the second roller relative to the width of the conveyor is adjustable, the second roller and conveyor being moveable relative to each other in a second direction that is perpendicular to the plane of the dough sheet so that a height of the second roller relative to the dough sheet is selectively variable at each of a position of the second roller between the first side and the second side while the second roller is rolling the dough sheet;
wherein a range of available variation of the height of the second roller at each position is independent of the position of the second roller in the first direction between the first side and the second side.

16. The device according to claim 15, further comprising:
an actuator configured to selectively vary the height of the second roller;
a controller for controlling the actuator;
wherein the controller is configured for controlling the actuator to selectively vary the height of the second roller based on a signal indicative of an unequal homogeneity in the dough;
wherein the height of the second roller above the upper surface of the conveyor at each of the positions of the second roller between the first side and the second side is variably adjusted based on the signal.

* * * * *